US011643102B1

(12) United States Patent
Calmer et al.

(10) Patent No.: US 11,643,102 B1
(45) Date of Patent: May 9, 2023

(54) DASH CAM WITH ARTIFICIAL INTELLIGENCE SAFETY EVENT DETECTION

(71) Applicant: Samsara Inc., San Francisco, CA (US)

(72) Inventors: Mathew Chasan Calmer, Sacramento, CA (US); Justin Delegard, West Chester, OH (US); Justin Pan, San Francisco, CA (US); Sabrina Shemet, Felton, CA (US); Meelap Shah, Portland, OR (US); Kavya Joshi, Mammoth Lakes, CA (US); Brian Tuan, Cupertino, CA (US); Sharan Srinivasan, San Francisco, CA (US); Muhammad Ali Akhtar, Chicago, IL (US); John Charles Bicket, Burlingame, CA (US); Margaret Finch, Austin, TX (US); Vincent Shieh, San Francisco, CA (US); Bruce Kellerman, Atlanta, GA (US); Mitch Lin, Berkeley, CA (US); Marvin Arroz, San Francisco, CA (US); Siddhartha Datta Roy, Decatur, GA (US); Jason Symons, Dublin, CA (US); Tina Quach, Los Altos, CA (US); Cassandra Lee Rommel, Chicago, IL (US); Saumya Jain, Redwood City, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/475,114

(22) Filed: Sep. 14, 2021

Related U.S. Application Data

(60) Provisional application No. 63/117,271, filed on Nov. 23, 2020.

(51) Int. Cl.
*G07C 5/08* (2006.01)
*B60W 50/14* (2020.01)
(Continued)

(52) U.S. Cl.
CPC ............ *B60W 50/14* (2013.01); *B60W 40/08* (2013.01); *G06F 3/012* (2013.01); *G06N 3/02* (2013.01);
(Continued)

(58) Field of Classification Search
CPC ................. B60W 50/14; B60W 40/08; B60W 2050/143; B60W 2520/105;
(Continued)

(56) References Cited

U.S. PATENT DOCUMENTS 5,917,433 A    6/1999   Keillor et al.
6,393,133 B1   5/2002   Breed et al.
(Continued)

FOREIGN PATENT DOCUMENTS

| CN | 108446600 A | * | 2/2018 | ......... G06K 9/00281 |
| CN | 110766912 | * | 12/2019 | ........... G08G 1/0133 |
| KR | 102324978 B1 | * | 11/2021 | ........ B60W 60/0015 |

OTHER PUBLICATIONS

U.S. Appl. No. 17/346,801, Dynamic Delivery of Vehicle Event Data, filed Jun. 14, 2021.
(Continued)

*Primary Examiner* — Hongmin Fan
(74) *Attorney, Agent, or Firm* — Knobbe, Martens, Olson & Bear LLP

(57) ABSTRACT

A vehicle dash cam may be configured to execute one or more neural networks (and/or other artificial intelligence), such as based on input from one or more of the cameras and/or other sensors associated with the dash cam, to intelligently detect safety events in real-time. Detection of a
(Continued)

safety event may trigger an in-cab alert to make the driver aware of the safety risk. The dash cam may include logic for determining which asset data to transmit to a backend server in response to detection of a safety event, as well as which asset data to transmit to the backend server in response to analysis of sensor data that did not trigger a safety event. The asset data transmitted to the backend server may be further analyzed to determine if further alerts should be provided to the driver and/or to a safety manager.

16 Claims, 9 Drawing Sheets

(51) Int. Cl.
| | |
|---|---|
| B60W 40/08 | (2012.01) |
| G07C 5/00 | (2006.01) |
| G06F 3/01 | (2006.01) |
| H04N 5/225 | (2006.01) |
| H04N 19/132 | (2014.01) |
| G06N 3/02 | (2006.01) |
| G06V 20/56 | (2022.01) |
| G06V 20/59 | (2022.01) |

(52) U.S. Cl.
CPC ............ *G06V 20/56* (2022.01); *G06V 20/597* (2022.01); *G07C 5/008* (2013.01); *G07C 5/0866* (2013.01); *H04N 5/2252* (2013.01); *H04N 19/132* (2014.11); *B60W 2050/143* (2013.01); *B60W 2520/105* (2013.01); *B60W 2540/229* (2020.02); *G06V 2201/10* (2022.01)

(58) Field of Classification Search
CPC .... B60W 2540/229; G06F 3/012; G06N 3/02; G06V 20/56; G06V 20/597; G06V 2201/10; G07C 5/008; G07C 5/0866; H04N 5/2252

See application file for complete search history.

(56) References Cited

U.S. PATENT DOCUMENTS

| | | | |
|---|---|---|---|
| 6,452,487 B1 | 9/2002 | Krupinski | |
| 8,633,672 B2 | 1/2014 | Jung et al. | |
| 8,774,752 B1 | 7/2014 | Akcasu et al. | |
| 9,024,744 B2 | 5/2015 | Klose et al. | |
| 9,445,270 B1 | 9/2016 | Bicket et al. | |
| 9,477,639 B2 | 10/2016 | Fischer et al. | |
| 9,731,727 B2 | 8/2017 | Heim et al. | |
| 9,911,290 B1 | 3/2018 | Zalewski et al. | |
| 9,952,046 B1 | 4/2018 | Blacutt et al. | |
| 10,033,706 B2 | 7/2018 | Bicket et al. | |
| 10,085,149 B2 | 9/2018 | Bicket et al. | |
| 10,102,495 B1 | 10/2018 | Zhang et al. | |
| 10,173,486 B1 | 1/2019 | Lee et al. | |
| 10,173,544 B2 | 1/2019 | Hendrix et al. | |
| 10,196,071 B1 | 2/2019 | Rowson et al. | |
| 10,206,107 B2 | 2/2019 | Bicket et al. | |
| 10,255,528 B1 | 4/2019 | Nguyen | |
| 10,390,227 B2 | 8/2019 | Bicket et al. | |
| 10,489,222 B2 | 11/2019 | Sathyanarayana et al. | |
| 10,503,990 B2 | 12/2019 | Gleeson-May et al. | |
| 10,579,123 B2 | 3/2020 | Tuan et al. | |
| 10,609,114 B1 | 3/2020 | Bicket et al. | |
| 10,623,899 B2 | 4/2020 | Watkins et al. | |
| 10,827,324 B1 | 11/2020 | Hajimiri et al. | |
| 10,843,659 B1 | 11/2020 | Innocenzi et al. | |
| 10,999,374 B2 | 5/2021 | ElHattab et al. | |
| 11,046,205 B1 | 6/2021 | Govan et al. | |
| 11,122,488 B1 | 9/2021 | Lloyd et al. | |
| 11,126,910 B1 | 9/2021 | Akhtar et al. | |
| 11,127,130 B1 | 9/2021 | Jain et al. | |
| 11,128,130 B2 | 9/2021 | Jain et al. | |
| 11,131,986 B1 | 9/2021 | Gal et al. | |
| 11,132,853 B1 | 9/2021 | Akhtar et al. | |
| 11,137,744 B1 | 10/2021 | Heddleston et al. | |
| 11,158,177 B1 | 10/2021 | ElHattab et al. | |
| 11,184,422 B1 | 11/2021 | Bicket et al. | |
| 11,188,046 B1 | 11/2021 | ElHattab et al. | |
| 11,190,373 B1 | 11/2021 | Stevenson et al. | |
| 11,341,786 B1 | 5/2022 | Calmer et al. | |
| 11,349,901 B1 | 5/2022 | Duffield et al. | |
| 11,352,013 B1 | 6/2022 | Srinivasan et al. | |
| 11,352,014 B1 | 6/2022 | Srinivasan et al. | |
| 11,356,605 B1 | 6/2022 | Shemet et al. | |
| 11,356,909 B1 | 6/2022 | Lloyd | |
| 11,365,980 B1 | 6/2022 | Akhtar et al. | |
| 11,386,325 B1 | 7/2022 | Srinivasan et al. | |
| 11,451,610 B1 | 9/2022 | Saunders et al. | |
| 11,451,611 B1 | 9/2022 | Saunders et al. | |
| 11,479,142 B1 | 10/2022 | Govan et al. | |
| 2002/0061758 A1 | 5/2002 | Zarlengo et al. | |
| 2002/0093565 A1 | 7/2002 | Watkins | |
| 2005/0286774 A1 | 12/2005 | Porikli | |
| 2006/0167591 A1 | 7/2006 | McNally | |
| 2007/0080816 A1 | 4/2007 | Haque et al. | |
| 2008/0252412 A1 | 10/2008 | Larsson et al. | |
| 2008/0319602 A1 | 12/2008 | McClellan et al. | |
| 2009/0034801 A1* | 2/2009 | Hammoud | G06K 9/00335 382/107 |
| 2009/0240427 A1 | 9/2009 | Siereveld et al. | |
| 2010/0049639 A1 | 2/2010 | Ferro et al. | |
| 2011/0276265 A1 | 11/2011 | Husain | |
| 2012/0076437 A1 | 3/2012 | King | |
| 2012/0201277 A1 | 8/2012 | Tanner et al. | |
| 2012/0235625 A1 | 9/2012 | Takehara | |
| 2012/0303397 A1 | 11/2012 | Prosser | |
| 2013/0073114 A1 | 3/2013 | Nemat-Nasser et al. | |
| 2013/0162421 A1 | 6/2013 | Inaguma et al. | |
| 2013/0244210 A1 | 9/2013 | Nath et al. | |
| 2014/0012492 A1 | 1/2014 | Bowers et al. | |
| 2014/0095061 A1 | 4/2014 | Hyde | |
| 2014/0098060 A1 | 4/2014 | McQuade et al. | |
| 2014/0193781 A1 | 7/2014 | Sands | |
| 2014/0195106 A1 | 7/2014 | McQuade et al. | |
| 2014/0195477 A1 | 7/2014 | Graumann et al. | |
| 2014/0278108 A1 | 9/2014 | Kerrigan et al. | |
| 2014/0324281 A1 | 10/2014 | Nemat-Nasser et al. | |
| 2014/0354227 A1 | 12/2014 | Tyagi et al. | |
| 2014/0354228 A1 | 12/2014 | Williams et al. | |
| 2014/0376876 A1 | 12/2014 | Bentley et al. | |
| 2015/0024705 A1 | 1/2015 | Rashidi | |
| 2015/0035665 A1 | 2/2015 | Plante et al. | |
| 2015/0044641 A1 | 2/2015 | Chauncey et al. | |
| 2015/0074091 A1 | 3/2015 | Walkin et al. | |
| 2015/0084757 A1 | 3/2015 | Annibale et al. | |
| 2015/0116114 A1 | 4/2015 | Boyles | |
| 2015/0226563 A1 | 8/2015 | Cox et al. | |
| 2015/0283912 A1 | 10/2015 | Shimizu et al. | |
| 2016/0034770 A1* | 2/2016 | Peterson | G06K 9/4661 701/49 |
| 2016/0046298 A1 | 2/2016 | DeRuyck et al. | |
| 2016/0267335 A1 | 9/2016 | Hampiholi | |
| 2016/0275376 A1 | 9/2016 | Kant | |
| 2016/0288744 A1 | 10/2016 | Rutherford et al. | |
| 2016/0343091 A1 | 11/2016 | Han et al. | |
| 2016/0375780 A1 | 12/2016 | Penilla et al. | |
| 2017/0039784 A1 | 2/2017 | Gelbart et al. | |
| 2017/0053555 A1 | 2/2017 | Angel et al. | |
| 2017/0055868 A1 | 3/2017 | Hatakeyama | |
| 2017/0061222 A1 | 3/2017 | Hoye et al. | |
| 2017/0088142 A1 | 3/2017 | Hunt et al. | |
| 2017/0102463 A1 | 4/2017 | Hwang | |
| 2017/0113664 A1 | 4/2017 | Nix | |
| 2017/0140603 A1 | 5/2017 | Ricci | |
| 2017/0200061 A1 | 7/2017 | Julian et al. | |
| 2017/0217444 A1 | 8/2017 | Chaston et al. | |
| 2017/0263049 A1 | 9/2017 | MacDonald et al. | |
| 2017/0286838 A1 | 10/2017 | Cipriani et al. | |
| 2017/0291611 A1 | 10/2017 | Innes et al. | |
| 2017/0292848 A1 | 10/2017 | Nepomuceno et al. | |

(56) References Cited

U.S. PATENT DOCUMENTS

| | | | |
|---|---|---|---|
| 2017/0332199 A1 | 11/2017 | Elliott et al. | |
| 2017/0345283 A1 | 11/2017 | Kwon et al. | |
| 2017/0366935 A1 | 12/2017 | Ahmadzadeh et al. | |
| 2018/0001771 A1 | 1/2018 | Park et al. | |
| 2018/0012196 A1 | 1/2018 | Ricci et al. | |
| 2018/0025636 A1 | 1/2018 | Boykin et al. | |
| 2018/0039862 A1 | 2/2018 | Hyatt et al. | |
| 2018/0048850 A1* | 2/2018 | Bostick | G06V 20/56 |
| 2018/0063576 A1 | 3/2018 | Tillman et al. | |
| 2018/0093672 A1 | 4/2018 | Terwilliger et al. | |
| 2018/0126901 A1* | 5/2018 | Levkova | G06K 9/00597 |
| 2018/0189913 A1 | 7/2018 | Knopp et al. | |
| 2018/0232583 A1 | 8/2018 | Wang et al. | |
| 2018/0259353 A1 | 9/2018 | Tsurumi et al. | |
| 2018/0262724 A1 | 9/2018 | Ross | |
| 2018/0276485 A1 | 9/2018 | Heck et al. | |
| 2018/0288182 A1 | 10/2018 | Tong et al. | |
| 2018/0365888 A1 | 12/2018 | Satzoda et al. | |
| 2019/0003848 A1 | 1/2019 | Hoten et al. | |
| 2019/0019068 A1 | 1/2019 | Zhu et al. | |
| 2019/0023208 A1 | 1/2019 | Boston et al. | |
| 2019/0050657 A1 | 2/2019 | Gleeson-May et al. | |
| 2019/0118655 A1 | 4/2019 | Grimes et al. | |
| 2019/0174158 A1 | 6/2019 | Herrick et al. | |
| 2019/0244301 A1 | 8/2019 | Seth et al. | |
| 2019/0286948 A1 | 9/2019 | Sathyanarayana et al. | |
| 2019/0318419 A1 | 10/2019 | VanderZanden | |
| 2019/0327590 A1 | 10/2019 | Kubo et al. | |
| 2019/0327613 A1 | 10/2019 | Bicket et al. | |
| 2019/0370577 A1 | 12/2019 | Meng et al. | |
| 2020/0074397 A1 | 3/2020 | Burda et al. | |
| 2020/0086879 A1* | 3/2020 | Lakshmi Narayanan | G06K 9/4628 |
| 2020/0139847 A1 | 5/2020 | Baumer et al. | |
| 2020/0150739 A1 | 5/2020 | Tuan et al. | |
| 2020/0162489 A1 | 5/2020 | Bar-Nahum et al. | |
| 2020/0192355 A1 | 6/2020 | Lu | |
| 2020/0207358 A1 | 7/2020 | Katz et al. | |
| 2020/0238952 A1 | 7/2020 | Lindsay et al. | |
| 2020/0294220 A1* | 9/2020 | Gonzalez Diaz | G06T 7/0004 |
| 2020/0312063 A1* | 10/2020 | Balakrishnan | G07C 5/008 |
| 2020/0327345 A1* | 10/2020 | Schumacher | G08B 21/06 |
| 2020/0342230 A1 | 10/2020 | Tsai et al. | |
| 2020/0342235 A1 | 10/2020 | Tsai et al. | |
| 2020/0342274 A1 | 10/2020 | ElHattab et al. | |
| 2020/0342506 A1 | 10/2020 | Levy et al. | |
| 2020/0342611 A1 | 10/2020 | ElHattab et al. | |
| 2020/0344301 A1 | 10/2020 | ElHattab et al. | |
| 2020/0371773 A1 | 11/2020 | Kato et al. | |
| 2020/0389415 A1 | 12/2020 | Zhao et al. | |
| 2021/0006950 A1 | 1/2021 | Hajimiri et al. | |
| 2021/0073626 A1 | 3/2021 | Brahma et al. | |
| 2021/0104159 A1 | 4/2021 | Tsai et al. | |
| 2021/0201666 A1* | 7/2021 | Pelleg | B60W 40/06 |
| 2021/0245749 A1* | 8/2021 | Ross | B60W 50/0097 |
| 2021/0279475 A1 | 9/2021 | Tusch et al. | |
| 2021/0287066 A1 | 9/2021 | Xie et al. | |
| 2021/0337460 A1 | 10/2021 | Breaux, III et al. | |
| 2021/0394775 A1 | 12/2021 | Julian et al. | |
| 2021/0403004 A1 | 12/2021 | Alvarez et al. | |
| 2022/0005332 A1 | 1/2022 | Metzler et al. | |

OTHER PUBLICATIONS

U.S. Appl. No. 17/726,386, Dynamic Delivery of Vehicle Event Data, filed Apr. 21, 2022.
U.S. Appl. No. 17/454,773, Refining Event Triggers Using Machine Learning Model Feedback, filed Nov. 12, 2021.
U.S. Appl. No. 17/661,689, Refining Event Triggers Using Machine Learning Model Feedback, filed May 2, 2022.
U.S. Appl. No. 17/454,790, Tuning Layers of a Modular Neural Network, filed Nov. 12, 2021.
U.S. Appl. No. 17/662,622, Tuning Layers of a Modular Neural Network, filed May 9, 2022.
U.S. Appl. No. 17/454,799, Ensemble Neural Network State Machine for Detecting Distractions, filed Nov. 12, 2021.
U.S. Appl. No. 17/811,512, Ensemble Neural Network State Machine for Detecting Distractions, filed Jul. 8, 2022.

* cited by examiner

DASH CAM WITH ARTIFICIAL INTELLIGENCE SAFETY EVENT DETECTION

TECHNICAL FIELD

Embodiments of the present disclosure relate to devices, systems, and methods that provide real-time safety event detection within a vehicle.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Processing sensor data from a vehicle that is usable to detect, in real-time, events that are indicative of a crash or increased risk of a crash, requires significant data storage and processing power. The sensor data may be transmitted to a server for application of event models, but this requires wireless data communications (with bandwidth and data speed varying widely based on geography), which causes delays in determination of safety events, reducing effectiveness of any alerts that are provided to the driver in the vehicle. Thus, real-time alerts are typically limited to simple alerts with limited accuracy and limited value in improving driver safety.

SUMMARY

The systems, methods, and devices described herein each have several aspects, no single one of which is solely responsible for its desirable attributes. Without limiting the scope of this disclosure, several non-limiting features will now be described briefly.

Further, as described herein, according to various embodiments systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, the present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, machine vision devices, and may enable a user to more quickly and accurately access, navigate, assess, and digest analyses, configurations, image data, and/or the like, than previous systems.

Various embodiments of the present disclosure provide improvements to various technologies and technological fields, and practical applications of various technological features and advancements. For example, as described above, existing machine vision systems are limited in various ways, and various embodiments of the present disclosure provide significant improvements over such technology, and practical applications of such improvements. Additionally, various embodiments of the present disclosure are inextricably tied to, and provide practical applications of, computer technology. In particular, various embodiments rely on detection of user inputs via graphical user interfaces, operation and configuration of machine vision devices, calculation of updates to displayed electronic data based on user inputs, automatic processing of image data, and presentation of updates to displayed images and analyses via interactive graphical user interfaces. Such features and others are intimately tied to, and enabled by, computer and machine vision technology, and would not exist except for computer and machine vision technology.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1A:
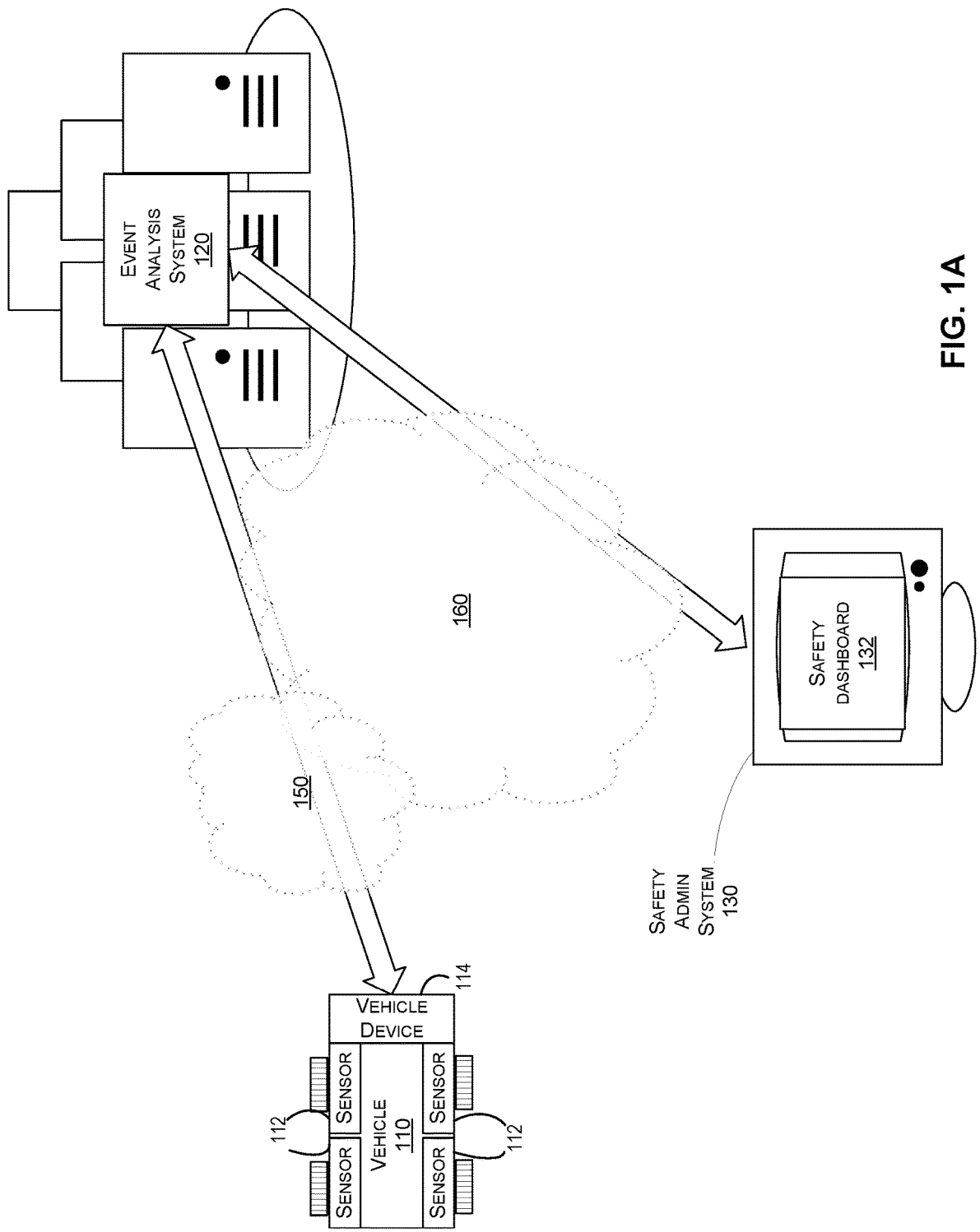
FIG. 1A illustrates an event analysis system in communication with a vehicle device and a safety admin system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

An improved artificial intelligence dash cam provides real-time alerts of detected safety events, such as driver assistance (e.g., ADAS or "Advanced Driver Assistance Systems"), harsh events, and/or other events of interest. The dash cam is installable into existing vehicles and provides real-time alerts based on processing of video data from one or more cameras of the dash cam. The safety event detection is performed local to the dash cam without transmitting data to a backend server for processing, so that the alerts are immediately actionable by the vehicle driver in reducing frequency and severity of accidents.

In some embodiments, the dash cam (which is referred to more generally as a "vehicle device") is configured to execute one or more neural networks (and/or other artificial intelligence or program logic), such as based on input from one or more of the cameras and/or other sensors associated with the dash cam, to intelligently detect safety events. The dash cam includes logic for determining which asset data to transmit to a backend server in response to detection of a safety event, as well as which asset data to transmit to the backend server in response to analysis of sensor data that did not trigger a safety event. The asset data transmitted to the backend server may be further analyzed to determine if further alerts should be provided to the driver and/or to a safety manager.

In some embodiments, the backend server (also referred to herein as the "backend," the "cloud," or an "event analysis system") may have context and perspective that individual vehicle devices do not have. For example, the backend may include data associate with a large quantity of vehicles, such as vehicles across a fleet or within a geographic area. Thus, the backend may perform analysis of asset data across multiple vehicles, as well between groups of vehicles (e.g., comparison of fleets operated by different entities). The backend can use uploaded asset data to optimize for both customer experience and data transfer quantity. For example, using metadata from a safety event (whether a false or positive safety event), the backend can make an informed go/no-go decision on whether a particular event should be shown in a safety dashboard or whether it may be a false positive. The backend may then decide whether asset data associated with the safety event should be transmitted from the vehicle device to the backend, for example only if the detected event is a positive event or an event meeting certain criteria. Thus, the amount of data transmitted to the backend server may be largely reduced, while maintaining the ability for the backend server to obtain as much data as needed to improve the event models (e.g., the neural networks that are executed on the vehicle device), further analyze asset data for applicability of safety events, and transmit corresponding alerts. An event analysis system may also include a feedback system that periodically updates event models used by vehicle devices to provide immediate in-vehicle alerts, such as when the backend server has optimized an event model based on analysis of asset data associated with many safety events, potentially across multiple fleets of vehicles.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Vehicle Device: an electronic device that includes one or more sensors positioned on or in a vehicle. A vehicle device may include sensors such as one or more video sensors, audio sensors, accelerometers, global positioning systems (GPS), and the like. Vehicle devices include communication circuitry configured to transmit event data to a backend (or "event analysis system"). Vehicle devices also include memory for storing software code that is usable to execute one or more event detection models, such as neural network or other artificial intelligence programming logic, that allow the vehicle device to trigger events without communication with the backend.

Event of interest (or "event"): circumstances of interest to a safety manager, fleet administrator, vehicle driver, and/or others. Events may be identified based on various combinations of characteristics associated with one or more vehicles. For example, an event associated with a vehicle may indicate a safety concern, such as a likelihood of a crash by the vehicle is above an expected threshold level.

Safety Event: an event that indicates an accident involving a vehicle, such as a crash of the vehicle into another vehicle or structure, or an event that indicates an increased likelihood of a crash of vehicle.

Driver Assistance Event: one type of safety event that does not necessarily indicate a crash, or imminent crash, but indicates that the driver should take some action to reduce likelihood of a crash. For example, driver assistance events may include safety events indicating that a vehicle is tailgating another vehicle, the vehicle is at risk of a forward collision, or the driver of the vehicle is distracted.

Harsh Event: one type of safety event indicating an extreme action of a driver and/or status of a vehicle. Harsh events may include, for example, detecting that a driver has accelerated quickly, has braked extensively, has made a sharp turn, or that the vehicle has crashed.

Event Model (or "triggering criteria"): a set of logic that may be applied to asset data to determine when an event has occurred. An event model may be, for example, an algorithm, statistical model, or neural network that takes as input one or more types of asset data. An event model may be stored in any format, such as a list of criteria, rules, thresholds, and the like, that indicate occurrence of an event.

Event models may be executed by a vehicle device and/or by an event analysis system (e.g., in the cloud).

Sensor Data: any data obtained by the vehicle device, such as asset data and metadata.

Event Data: data associated with an event, such as a set of sensor data (e.g., metadata and/or asset data), such as photographs, video files, etc., associated with a detected safety event.

Asset Data (or "Asset"): any data associated with a vehicle and/or driver of the vehicle, such as data that is usable by an event model to indicate whether a safety event has occurred. Asset data may include video files, still images, audio data, and/or other data files. Example of asset data include:

- Video files, which may be uploaded for each camera of a multi-camera vehicle device. Video files that are uploaded to the event analysis system may be trimmed to a default length by the vehicle device (e.g., 3 seconds before and 3 seconds after the detected safety event) and/or may be selected based on rules associated with the detected event. Video transcode may be customized to adjust the bit rate, frame rate, resolution, etc. of video files.
- Still Images from each camera, e.g., single frames of a video file, may be transmitted to the event analysis system either as part of initial event data transmitted to the event analysis system after detecting a safety event and/or in response to a request for still images from the event analysis system. In situations where the event analysis system requests still images from a vehicle device, the event analysis system may determine image settings (e.g., image quality, downsampling rate, file size, etc.), as well as timeframe from which images are requested (e.g., one image every 0.2 seconds for the five second time period preceding the detected event).
- Audio data can be combined with video, or sent separately and transcoded into video files after the fact. The event analysis system may determine audio transcoding parameters for requested audio data.

Metadata: data that provides information regarding a detected event, typically in a more condensed manner than the related asset data. Metadata may include, for example, accelerometer data, global positioning system (GPS) data, ECU data, vehicle speed data, forward camera object tracking data, inward (driver)-facing camera data, hand tracking data and/or any other related data. For example, metadata regarding a triggered event may include a location of an object that triggered the event, such as a vehicle in which a forward collision warning ("FCW") or tailgating safety event has triggered, or position of a driver's head ("head pose") when a distracted driver event has triggered. Metadata may include calculated data associated with a detected safety event, such as severity of the event, which may be based on one or more event models that may consider duration of an event, distance to a leading vehicle, and/or other event data. Metadata may include information about other vehicles within the scene in the case of tailgating or FCW event, as well as confidence levels for these detections. Metadata may also include information such as event keys and other identification information, event type, event date and time stamps, event location, and the like.

Features: an "interesting" part of sensor data, such as data that is extracted from and/or derived from sensor data and may provide an abstraction of the sensor data. Event models may identify features, such as those that are useful in triggering a safety event. Features may include items (and/or metadata associated with those Items) such as objects within images obtained by one of the cameras of the dash cam. Other examples of features may include eye pose, head pose, objects in images, other vehicle metadata, such as GPS, acceleration, and the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example Event Detection Models

As will be discussed further herein, the vehicle device and/or the event analysis system may implement certain machine learning techniques that are configured to identify features within sensor data, such as in images from one or more of the outward-facing or inward-facing cameras of the vehicle device, audio detected by one or more microphones of the vehicle device, metadata from other sensors, and the like. The feature detection may be performed by a feature detection module (e.g., part of the vehicle device and/or the event detection system), which may include program code executable by one or more processors to analyze video data, audio data, sensor data (e.g., motion sensors, positioning, etc.) and/or any other sensor data. While some of the discussion herein is with reference to analysis of video data, such discussions should be interpreted to also cover analysis of any other type of data, such as any asset data.

In some embodiments, the vehicle device can process video data locally to identify various associated features, such as detection of an object (e.g., a person or a vehicle), characteristics of the object (e.g., speed, distance, dimensions, etc.), location of the object within the image files of the video, and the like. This feature data comprises metadata, which can be indexed (e.g., to a corresponding video recording or video feed) to track the time ranges that each detection begins and ends in video data. Such metadata, and other optimized data, can then be analyzed by event detection models executing on the vehicle device and/or selectively transmitted to the event analysis system.

In some embodiments, the feature detection module and/or event models (e.g., executed by the vehicle device or the event analysis system) can include a machine learning component that can be used to assist in detection of safety events, such as in real-time at the vehicle device. For example, the machine learning component can implement machine learning algorithms or artificial intelligence (AI) to generate and/or update neural networks that are executed by a processor (e.g., in the vehicle device and/or the event analysis system). In some embodiments, the machine learning component can use one or more machine learning algorithms to generate one or more models or parameter functions for the detections. The machine learning component can be configured to generate an event model that understands which types of data indicate which types of detections. One or more of these event models may be used to determine an expected value or occurrence based on analysis of received data. In some embodiments, video recording criteria (e.g., pre-configured video recording criteria) can be designated by a user, admin, or automatically. For example, the video recording criteria can indicate which types of detected features to monitor, record, or analyze. By designating specific types of detections, resources (e.g., processing power, bandwidth, etc.) can be preserved for only the types of feature detections desired.

Various types of algorithms may be used by the machine learning component to generate the event detection models (e.g., that perform feature detection and related event detection). For example, certain embodiments herein may use a logistical regression model, decision trees, random forests, convolutional neural networks, deep networks, or others. However, other event detection models are possible, such as a linear regression model, a discrete choice model, or a generalized linear model. The machine learning algorithms can be configured to adaptively develop and update the event detection models over time based on new input received by the machine learning component. For example, the event detection models executed by the vehicle device may be regenerated on a periodic basis (e.g., by the event analysis system) as new received data is available to help keep the predictions in the event detection model more accurate as the data is collected over time. Also, for example, the event detection models may be regenerated based on configurations received from a user or management device.

Some non-limiting examples of machine learning algorithms that can be used to generate and update event detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, copious amounts (such as terabytes or petabytes) of received data may be analyzed to generate models without manual analysis or review by one or more people.

Example Event Analysis System and Vehicle Device

FIG. 1A illustrates an event analysis system 120 in communication with a vehicle device 114 and a safety admin system 130. In this embodiment, the vehicle 110 includes a vehicle device 114, which may physically incorporate and/or be coupled to (e.g., via wired or wireless communication channel) a plurality of sensors 112. In some embodiments, the vehicle device 114 comprises a dash cam, such as the example dash cam illustrated in FIGS. 1B-1D. In other embodiments, the vehicle device 114 may include other components.

The sensors 112 may include, for example, one or more inward-facing camera and one or more outward-facing camera. The vehicle device 114 further includes one or more microprocessors and communication circuitry configured to transmit data to the event analysis system 120, such as via one or more of the networks 150, 160. In this example, a safety dashboard 132 may be generated on a safety admin system 130 to illustrate event data from the event analysis system 120, such as via an online portal, e.g., a website or standalone application. The safety admin system 130 may be operated, for example, by a safety manager that reviews information regarding triggered safety events associated with a fleet of drivers/vehicles.

Various example computing devices 114, 120, and 130 are shown in FIG. 1A. In general, the computing devices can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that allows a user to access interactive user interfaces, view images, analyses, or aggregated data, and/or the like as described herein. In various embodiments, users may interact with various components of the example operating environment (e.g., the safety admin system 130, the event analysis system 120, etc.) via various computing devices. Such interactions may typically be accomplished via interactive graphical user interfaces or voice commands, however alternatively such interactions may be accomplished via command line, and/or other means.

As shown in the example of FIG. 1A, communications between the vehicle device 114 and event analysis system 120 primarily occurs via network 150, while communication between the event analysis system 120 and safety admin system 130 typically occurs via network 160. However, networks 150, 160 may include some or all of the same communication protocols, services, hardware, etc. Thus, although the discussion herein may describe communication between the vehicle device 114 and the event analysis system 120 via the network 150 (e.g., via cellular data) and communication between the event analysis system 120 and the safety admin system 130 via a wired and/or a wireless high-speed data communication network, communications of the devices are not limited in this manner.

In some embodiments, the vehicle device transmits encrypted data via SSL (e.g., 256-bit, military-grade encryption) to the event analysis system 120 via high-speed 4G LTE or other wireless communication technology, such as 5G communications. The network 150 may include one or more wireless networks, such as a Global System for Mobile Communications (GSM) network, a Code Division Multiple Access (CDMA) network, a Long Term Evolution (LTE) network, or any other type of wireless network. The network 150 can use protocols and components for communicating via the Internet or any of the other aforementioned types of networks. For example, the protocols used by the network 150 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The network 160 may similarly include any wired network, wireless network, or combination thereof. For example, the network 160 may comprise one or more local area networks, wide area network, wireless local area network, wireless wide area network, the Internet, or any combination thereof.

Figure 1B:
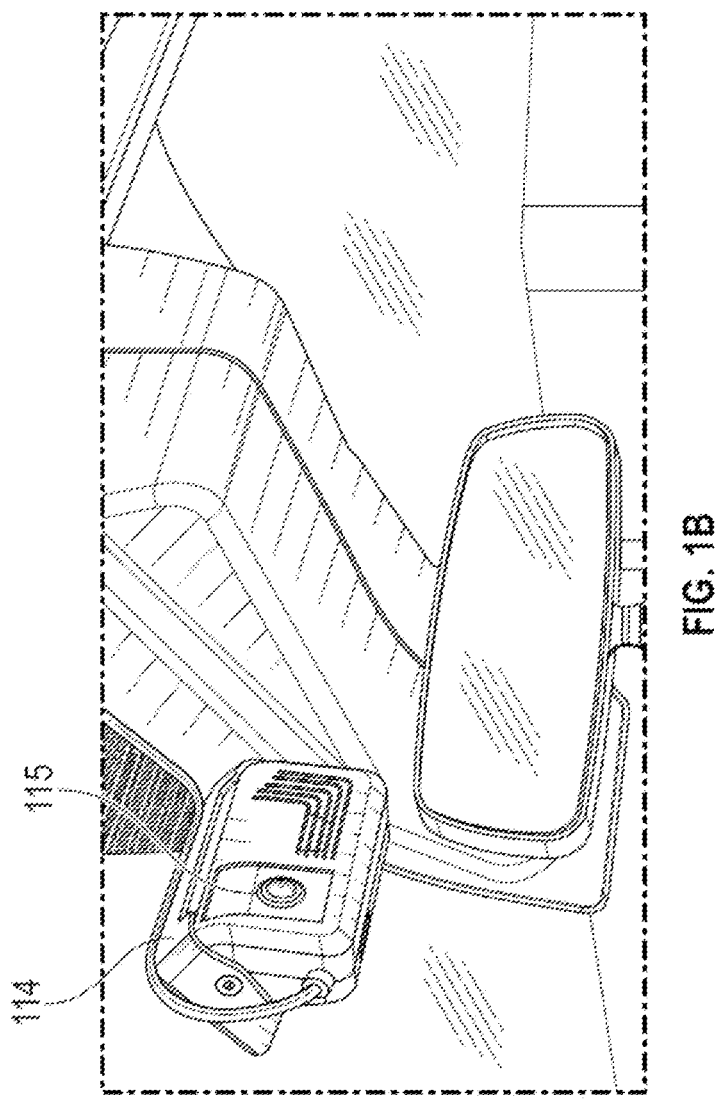
FIG. 1B illustrates an example vehicle device mounted inside a vehicle.
Figure 1C:
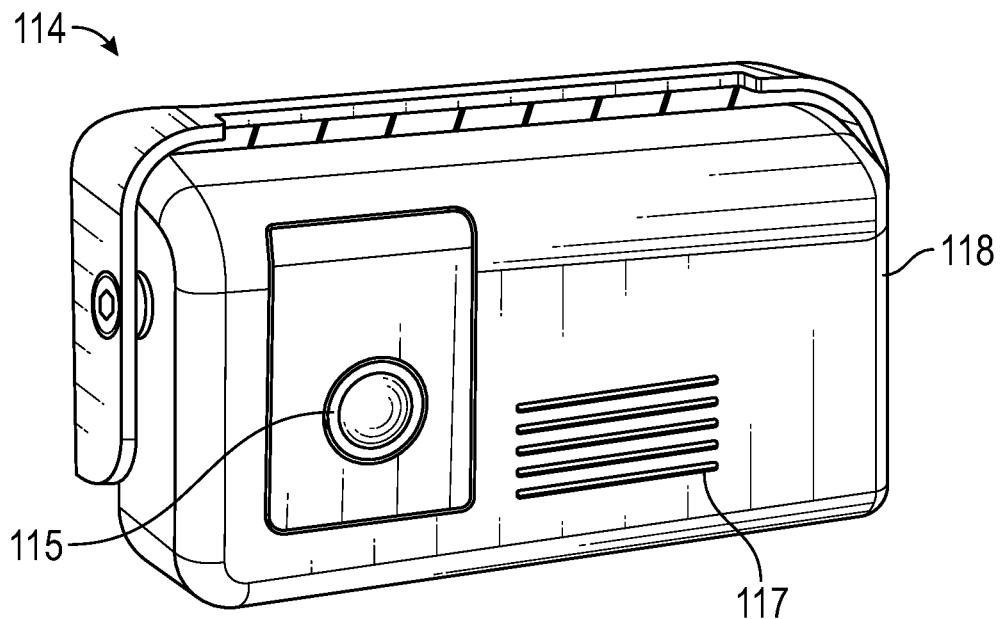
FIG. 1C is a front view of the vehicle device of FIG. 1B, showing the inward-facing camera.
Figure 1D:
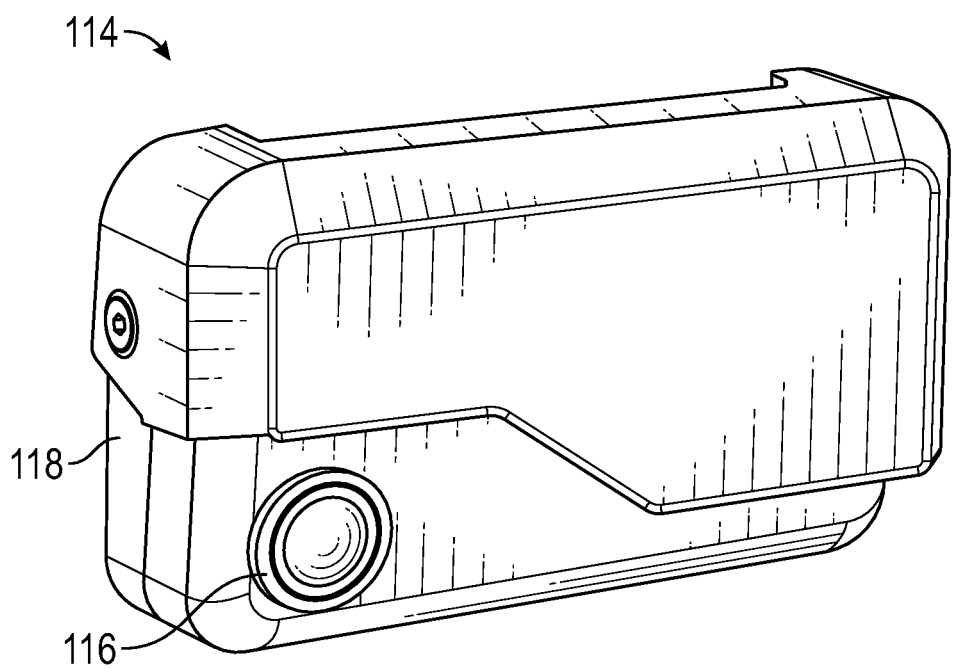
FIG. 1D is a rear view of the vehicle device of FIG. 1B, showing an outward-facing camera.

FIG. 1B illustrates an example vehicle device 114 with an inward-facing camera 115 mounted inside a vehicle. FIG. 1C is a front view of the vehicle device 114 showing the inward-facing camera 115, and FIG. 1D is a rear view of the vehicle device 114 showing an outward-facing camera 116 (e.g., positioned to obtain images forward of the vehicle). In this example, the vehicle device 114 includes an access panel 117 configured to allow alert signals from a speaker within the enclosure 118 of the vehicle device 114 to be better heard within the vehicle. In some embodiments, a microphone is positioned behind the access panel 117 also, or behind a similar additional access panel. In other embodiments, the vehicle device may include different quantities of video and/or still image cameras. These dual-facing cameras (e.g., the inward-facing camera 115 and one or more outward-facing cameras 116) may be configured to automatically upload and/or analyze footage using event detection models configured to detect (or "trigger") safety events. For example, as discussed further herein, the vehicle device 114 may advantageously apply event detection models to sensor data, including video data from one or more of the cameras, to detect safety events in real time as the events are happening. While the specifications of vehicle devices may vary greatly from one implementation to another, in one example embodiment a vehicle device may include some or all of the components below:

- Outward-facing camera with a field of view of 121° or more, resolution of at least 1080p (Full HD) video, frame rate of at least 30 frames per second, HDR to optimize for bright and low-light conditions.
- Inward-facing camera with a field of view of 177° or more to identify unsafe in-cab behaviors, resolution of at least 720p (HD) video, frame rate of at least 30 frames per second, infrared LED for unlit nighttime in-cab video.
- Audio input and/or output device(s) configured to provide voice coaching, such as voice-based feedback and alerts in response to detection of safety events, as well as the ability to turn on audio capture (e.g., via one or more microphones) for extra context during disputes and incidents.
- Recording capabilities and storage to record video footage for a rolling time period. For example, 60-100 hours or more of driving time video may be stored on the vehicle device, with an option for retrieval by the event analysis system, such as to provide additional context associated with a detected safety event in a safety dashboard. Video data may be automatically uploaded to an event analysis system (e.g., in the cloud) for further analysis, such as automatically uploading five seconds before to five seconds after each safety event is detected. Still images may also be captured and stored locally and/or transmitted to the event analysis system. A panic button may be provided to allow the driver to manually trigger a safety event and upload video footage from one or more of the cameras. For example, the panic button may be a physical button on the vehicle device enclosure 118 and/or a virtual (or software) button that may be activated by a voice command from the driver (or a passenger in the vehicle).
- Data transfer circuitry configured to automatically upload event data (e.g., metadata and asset data) to the event analysis system, where the event data may be further analyzed. In some implementations, the data transfer circuitry is configured to detect availability of cellular connectivity and, when connectivity is below a threshold, delay transmission of until cellular connectivity improves.
- Mounting hardware for easily mounting on the inside of a windshield, such as with heavy duty acrylic foam tape, suction cup, velcro, or the like. Tilt control to allow for proper inward-facing orientation with a wide variety of windshields.
- One or more accelerometers, such as accelerometers that measure acceleration (and/or related G forces) in each of multiple axes, such as in an X, Y, and Z axis.
- One or more computer processors, such as high-capacity processors that enable concurrent neural networks for real-time artificial intelligence.

Example Safety Event Detection and Communications

Figure 2:
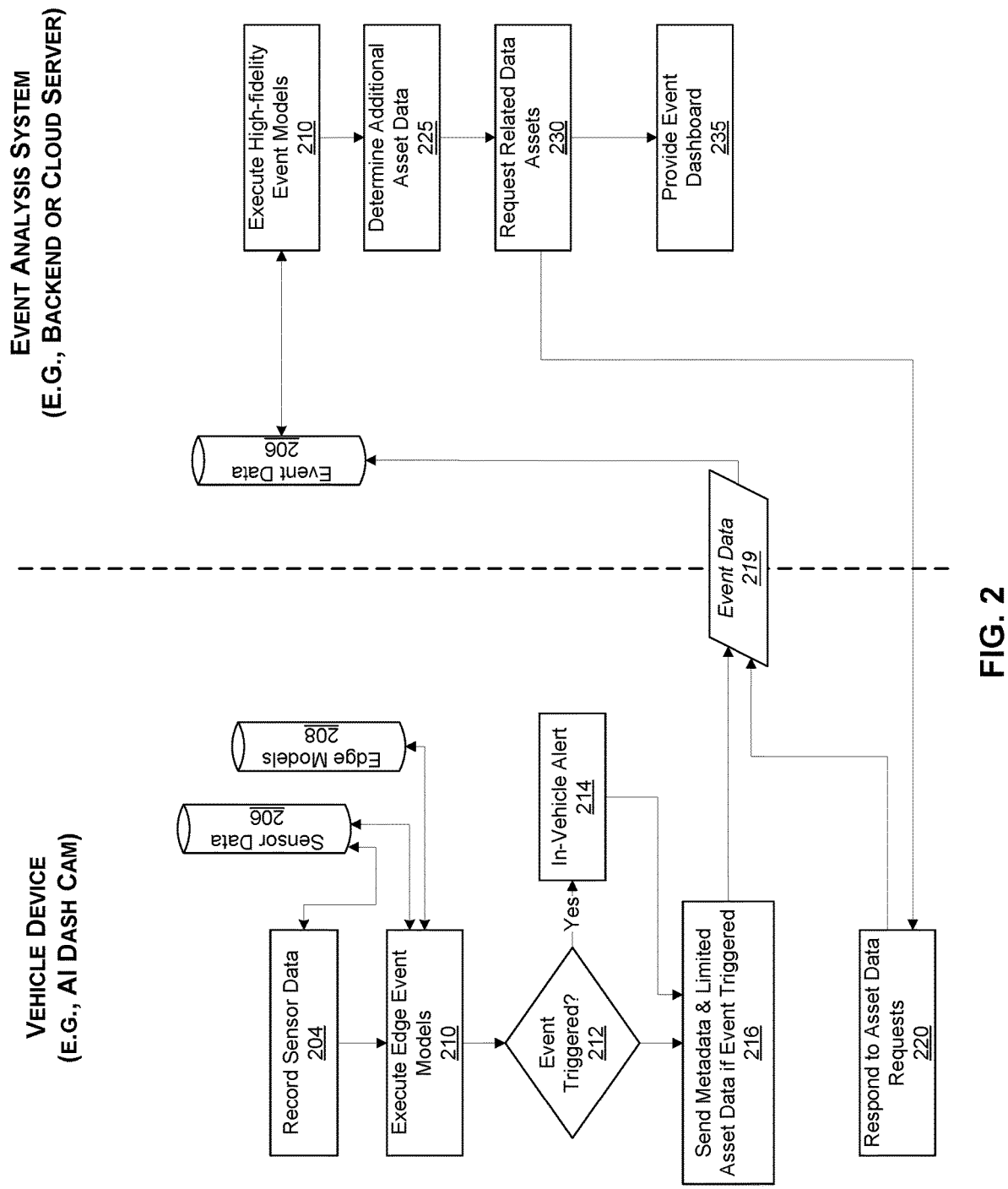
FIG. 2 is a flow diagram illustrating an example process for the vehicle device to detect safety events.

FIG. 2 is a flow diagram illustrating an example process for the vehicle device to detect safety events, such as by processing video data using one or more neural networks, and selectively communicating event data to an event analysis system. In general, the processes illustrated on the left are performed by the vehicle device, while processes on the right are performed by an event analysis system. Depending on the embodiment, however, the processes may be performed by different devices than illustrated, the method may include fewer or additional blocks, and/or the blocks may be performed in an order different than is illustrated.

Beginning at block 204, sensor data (e.g., video data) is stored for processing by one or more event models. For example, sensor data output from the multiple sensors 112 associated with the vehicle device 114 of FIG. 1A may be recorded at block 204. As shown, at least some of the sensor data (e.g., metadata and asset data) is stored in a sensor data store 206. For example, video data and metadata from one or more sensors may be stored for a particular time period (e.g., 2, 12, 24 hours, etc.).

Next, at block 210, one or more event models are executed on the sensor data, which may be accessible via the sensor data store 206. In some embodiments, the event models executed at block 210 are configured to identify harsh events indicative of a sudden, extreme, and/or unexpected movement of the vehicle and/or driver. Related U.S. Application No. 63/113,645, titled "Dynamic Delivery of Vehicle Event Data," filed on Nov. 13, 2020, which is hereby incorporated by reference in its entirety and for all purposes, includes further methods and circuitry for detecting harsh events. In addition, or as an alternative, to detection of harsh events, the vehicle device 114 advantageously executes one or more event models (e.g., neural networks) on sensor data, such as video data, to detect safety events, such as a tailgating, forward collision risk, and/or distracted driver event.

In some embodiments, the neural networks that are executed for detection of safety events at the vehicle device are optimized for low latency, high recall, and low precision, whereas neural networks that are executed at the event analysis system may be optimized for higher precision. Thus, the neural networks executed on the vehicle device are optimized to be executed in real-time (e.g., low latency), to have a high proportion of actual positives identified correctly (e.g., high recall), and to not be overly concerned with the proportion of positive identifications that were actually correct (e.g., low precision). Accordingly, the outputs of the neural networks at the vehicle device may be provided in substantially real-time to the actual occurrence of a detected event, such that an alert and/or other preventative actions may be taken to minimize further risks. In contrast, the neural networks that are executed at the event analysis system do not typically have the same time pressure and the event analysis system includes significantly more processing power and bandwidth. Accordingly, in some embodiments neural networks for detecting safety events may be trained at the event analysis system for use with the low latency, high recall, and low precision constraints associated with the vehicle device, and provided to the vehicle device periodically and/or when significant updates to the neural network are made.

In some embodiments, the event detection models executed at the vehicle device are performed on downsampled images from the video feed. For example, a portion of the outward-facing video feed, such as a 300×300 pixel area of the 1920×1080 pixel video, may be extracted from the video feed to enable the low latency analysis needed to provide real-time alerts at the vehicle device. The extracted portion may change in size or position over time, such as in response to a periodic analysis of a frame of the video image to detect features of interest. In some embodiments, the additional asset data is periodically transmitted to the event analysis system, regardless of detection of safety events. For example, in some implementations a still image from the outward-facing video camera may be transmitted to the event analysis system every two minutes. Such additional asset data may be used in training the neural networks.

In some embodiments, the event detection settings, such as criteria and/or thresholds for detection of a safety event, may be determined by user configurable settings, allowing the user (e.g., an owner or manager of a fleet) to either use defaults based on vehicle type (e.g., passenger, light duty, or heavy duty), or to set custom combinations of conditions that are necessary for triggering of an event by the event detection models executed on the vehicle device. These event detection settings may be used in generation of event detection models, e.g., incorporated into the training data that is provided to a neural network, and/or applied algorithmically, e.g. as rules, to sensor data. For example, in some implementations event detection models are configured to detect conditions indicative of a safety event by processing video data, and to output an indication of any detected event along with a confidence level of event detection. These outputs from the neural network, along with other metadata and/or asset data, may then be used to evaluate user—configured event detection settings.

Figure 3:
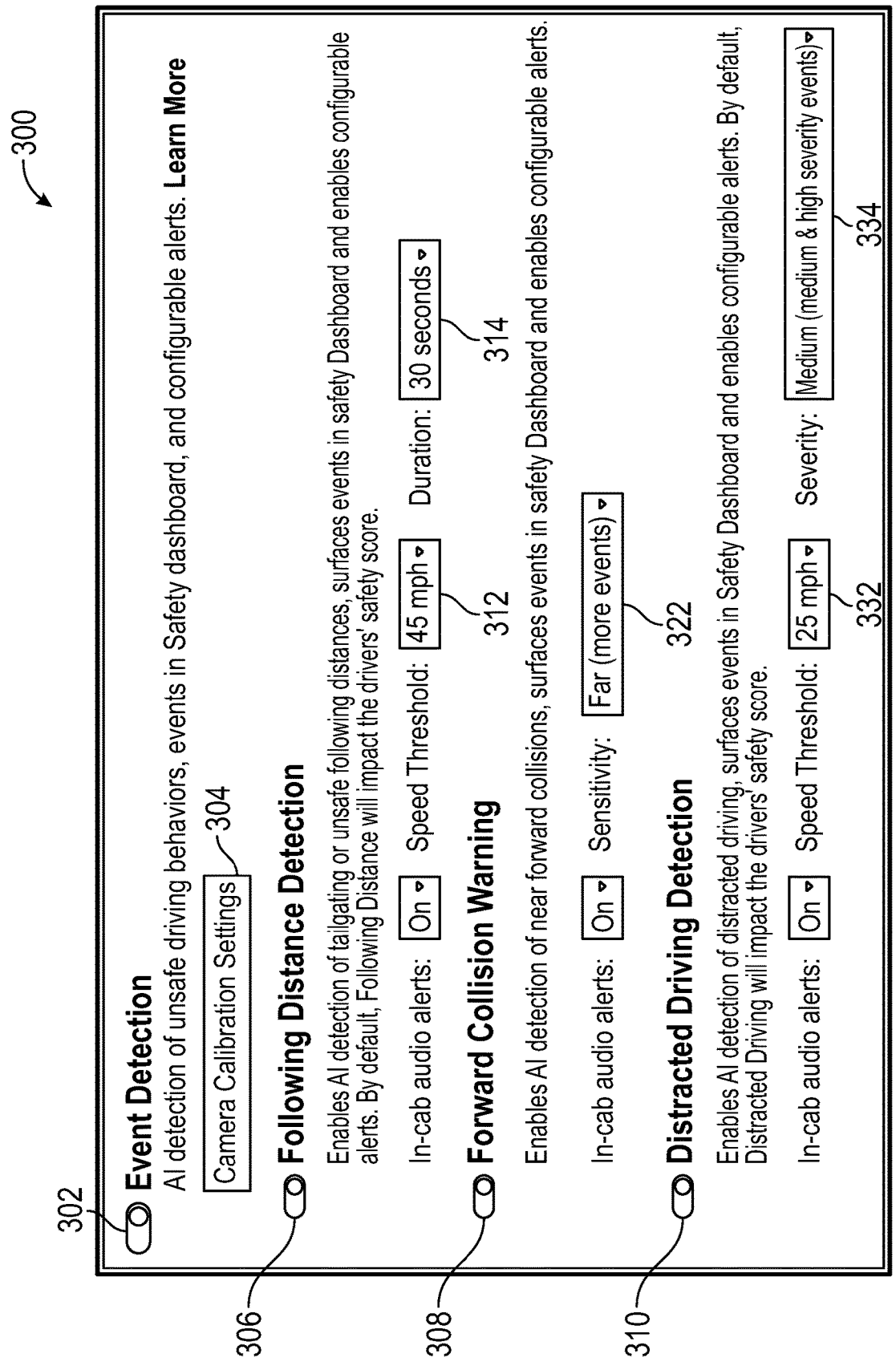
FIG. 3 is an example user interface that may be accessed by a user to designate event detection settings for a particular vehicle or group of vehicles (e.g., a fleet of similar delivery trucks).

In some embodiments, a user may set event detection settings via the safety dashboard 132. FIG. 3 is an example user interface 300 that may be accessed by a user to designate event detection settings for a particular vehicle or group of vehicles (e.g., a fleet of similar delivery trucks). In this example, the user may select settings for each of a tailgating, forward collision, and distracted driving safety events. An event detection control 302 is configured to allow the user to turn event detection off and on. Additionally, camera calibration settings may be accessed via button 304. Execution of event models for detection of each type of safety event may be independently turned on and off, via the tailgating control 306, forward collision control 308, and distracted driving control 310.

In the example of FIG. 3, the tailgating settings include an option to enable in-cab audio alerts (that are delivered via the vehicle device 114), set a minimum speed threshold 312 at which the vehicle must be traveling for the tailgating safety event to be triggered, and a duration 314 for which the tailgating conditions must be met for alert to trigger. Thus, the example settings shown in FIG. 3 would trigger and an in-cab audio alert in response to detection of a tailgating condition (e.g., a distance to a car in front of the vehicle, a "leading vehicle," is determined, such as by analysis of video data, to be less than a threshold distance or travel time) for 30 seconds while the vehicle is moving at a speed of 45 MPH or more. In some implementations, additional settings for the tailgating event may be user configurable, such as a minimum distance and/or travel time between the vehicle and a leading vehicle, cool-off time period from triggering an alert until another alert is triggered, asset data to be transmitted to the event analysis system in response to triggering of a tailgating safety event, and/or any other available sensor data. In some embodiments, the cool-off time period may be reset when the lead vehicle changes. Thus, multiple tailgating events may be triggered within the cool-off time period (e.g., 5 minutes) because the time period is reset each time the lead vehicle changes.

Figure 4:
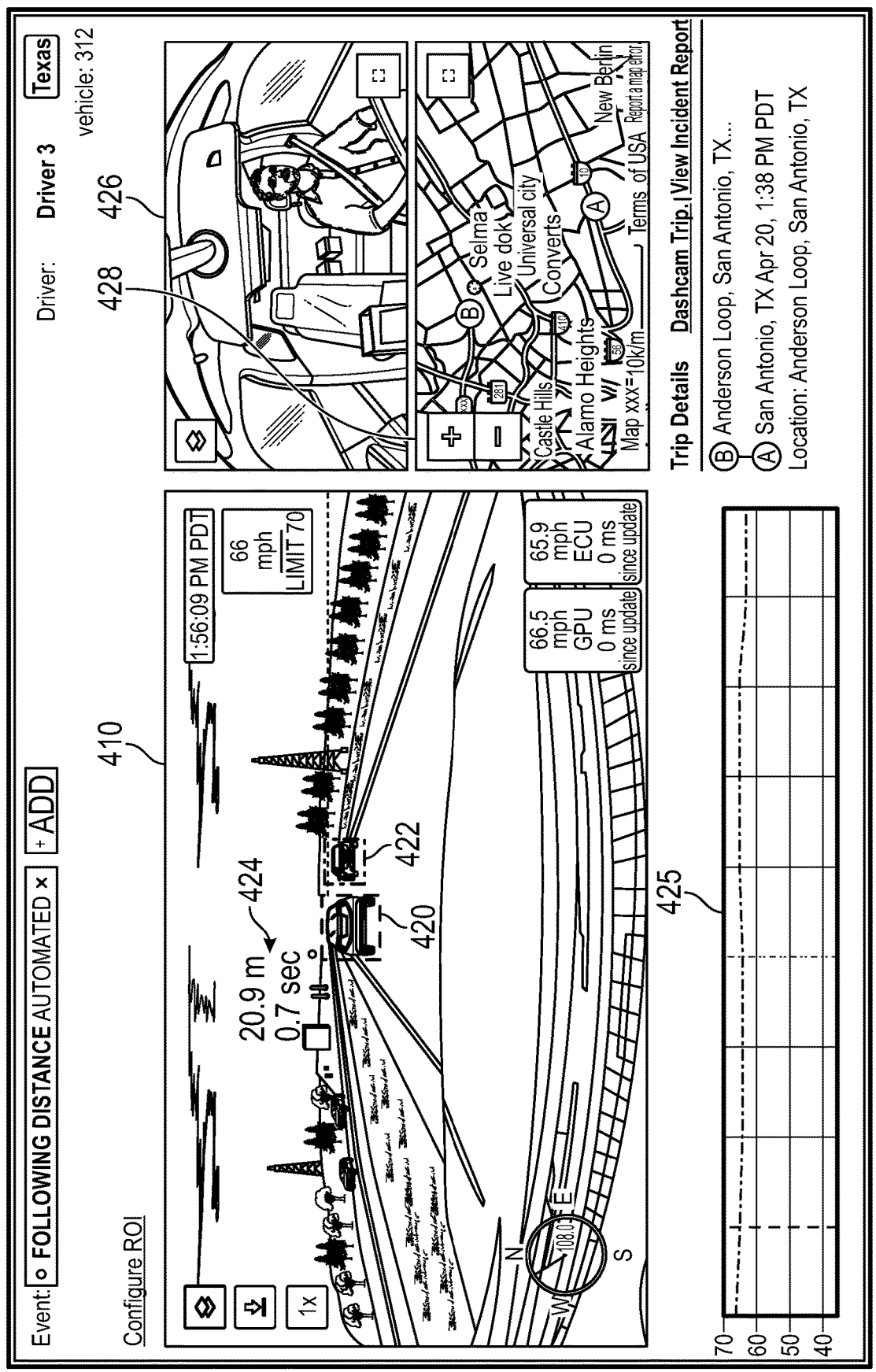
FIG. 4 is an example user interface that may be provided to the user as part of the safety dashboard, such as via a web enabled interface that is viewed on a desktop, portable, or mobile device.

FIG. 4 is an example user interface that may be provided to the user as part of the safety dashboard, such as via a web enabled interface that is viewed on a desktop, portable, or mobile device. This example user interface illustrates asset data associated with a tailgating alert. In some embodiments, certain metadata is transmitted to the event analysis system immediately upon detection of a safety event, such that a safety manager may immediately be alerted of a situation where action may be prudent. Certain asset data associated with the alert, such as video files and/or other larger asset data, may be transmitted to the event analysis system sometime after the safety event has triggered, such as when cellular communication bandwidth is available for transmission of video data. In some embodiments, asset data may be transmitted to the event analysis system in response to requests for specific asset data from the event analysis system.

In the example of FIG. 4, a video replay window 410 is configured to a play back a portion of video data associated with the detected tailgating event, in this embodiment with certain metadata superimposed on the video. For example, in this embodiment the metadata shows bounding boxes 420, 422 indicating objects identified by the feature detection neural network executed by the vehicle device and/or event analysis system. Additionally, for the lead vehicle in bounding box 420, following distance 424 is indicated in meters and travel time. Thus, the viewer of the video can monitor how closely the vehicle follows a leading vehicle throughout the duration of the video clip, such as a 20 second video segment preceding the triggered alert. A speed chart 425 shows the speed of the vehicle throughout the recorded video segment. The example dashboard view in FIG. 4 also includes video 426 from the inward-facing camera and a map 428 that may show position of the vehicle on the map (e.g., with a bright colored dot) moving in conjunction with both the outward-facing video 410 and the inward-facing video 426. Additionally, a slider or other indicator may move along the speed chart 425 in sync with movement of the videos and vehicle placement on the map.

Returning to FIG. 3, a user may configure settings for providing an in cab audio alert, as well as the sensitivity 322 for providing forward collision alerts. In some embodiments, other settings for forward collision alerts may be customized, such as whether alerts are triggered during daytime and/nighttime modes, details for detecting whether a collision course with a leading vehicle is likely, whether turning or deceleration impacts triggering of an alert, a minimum speed threshold, a minimum time to collision threshold, a cool-off time period, and/or any other available sensor data. In some embodiments, default settings may be configured to trigger a forward collision warning event only if night mode is enabled, a forward collision is likely (e.g., a neural network executed on the vehicle device reaches a confidence level for certainty that a forward collision is likely, such as based on analysis of video and/or other sensor data), the vehicle is not currently turning or decelerating, the vehicle is traveling above a minimum speed threshold, a time to collision threshold has been passed, and a forward collision warning alert has not been triggered within a cool-off time period. In other embodiments, other combinations of these criteria and/or other criteria may be set as defaults and/or user configurable. Similar to the tailgating safety event discussed above, a safety dashboard may provide video and other asset data associated with a triggered forward collision warning event in a similar manner as illustrated in FIG. 4.

With reference to the distracted driving safety event 310, in this example the user may customize settings for providing an in cab audio alert, a speed threshold 332, and a severity setting 334. In this example, an in-cab audio alert would be provided in response to the vehicle traveling at a speed of 25 MPH or more when a medium or severe distracted driver condition is detected (e.g., a confidence level of a districted driver condition output by a neural network analyzing inward-facing video of the driver exceeds a medium threshold level). In some embodiments, default settings may be configured to trigger a distracted driving safety event by detecting the pose of the driver's head and determining a difference (e.g., in degrees up or down and/or left or right) from a straight ahead head pose for the driver. In some embodiments, each driver's straight ahead head pose (e.g., the 0 degrees head pose) is initially calibrated by the vehicle device so that the differences with head poses that are calculated during driving are more accurately tuned to the particular driver.

In some embodiments, the distracted driving event detection model is configured to trigger an alert if the head pose angle (e.g., current head pose minus straight ahead head pose for the driver) is larger than a configurable threshold, such as 20 degrees. In some embodiments, the alert may only be triggered if a confidence level associated with the head pose angle exceeds a threshold, such as an 80% confidence level. Additionally, the distracted driver safety event may be configured to only trigger after the head pose angle and confidence level exceed the threshold levels for a minimum time period, such as 5 seconds. In some implementations, when a distracted driver alert is triggered, causing an in-cab alert to sound, modified event detection settings are applied to monitor whether the driver has remedied the distracted (or potentially drowsy) driving condition. For example, in some embodiments the driver is considered distracted until they have altered their head pose to less than a lower head pose angle (e.g., less than 12.5 degrees), perhaps for a threshold time period.

Figure 5:
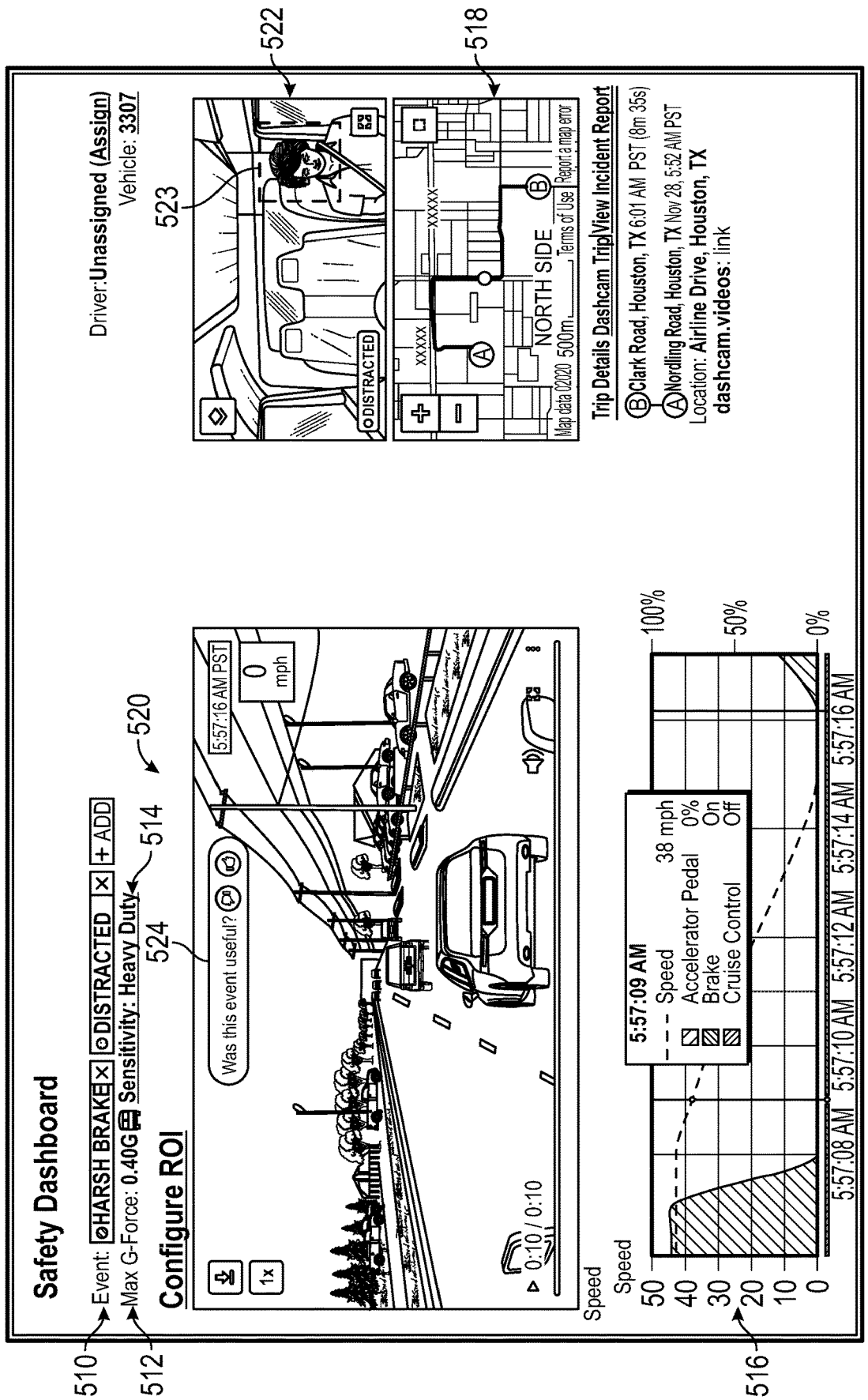
FIG. 5 is an example user interface that provides information regarding a detected safety event, in this case a harsh braking and a distracted driver event.

FIG. 5 is an example user interface that provides information regarding a detected safety event, in this case a harsh braking and a distracted driver event. The example user interface includes both event metadata and asset data, and provides an option for the user to provide feedback on whether the provided alert data was helpful. In this example, the event type 510 is indicated as both a harsh braking and a distracted driver safety event. Additionally, the dashboard provides the maximum G force 512 detected during the event, as well as the default vehicle type setting used in detecting the events. In this example, a time series graph 516 of certain metadata associated with the detected events is illustrated. The charted metadata in graph 516 includes speed, accelerator pedal usage, brake activation indicator, and cruise control activation indicator. In other embodiments, other metadata may be charted, such as based on user preferences. In the example of FIG. 5, metadata indicating location of the vehicle (e.g., GPS data) before and after the detected event is provided in a map view 518 and video data associated with the detected event is provided in outward-facing video 520 and inward-facing video 522. As shown in video 522, a bounding box 523 may be indicated around the driver's head. As the video plays, the bounding box may change colors and/or other visual characteristics at the time when the distracted driver event is triggered to indicate to the viewer when the distracted driving criteria have been met.

In the example of FIG. 5, the user interface brings together not only the initial metadata that was transmitted by the vehicle device after detection of the safety event, but subsequent asset data that were requested by the event analysis system. In some embodiments, the displayed data is synchronized, such that each of the outward-facing video 520, inward-facing video 522, map view 518, and time series graph 516 each depict information associated with a same point in time (e.g., a particular time during the ten seconds of event data associated with a detected safety event). As noted above, the user may interact with pop-up 524 to provide feedback to the event analysis system that may be used in updating and/or optimizing one or more event models.

Figure 6:
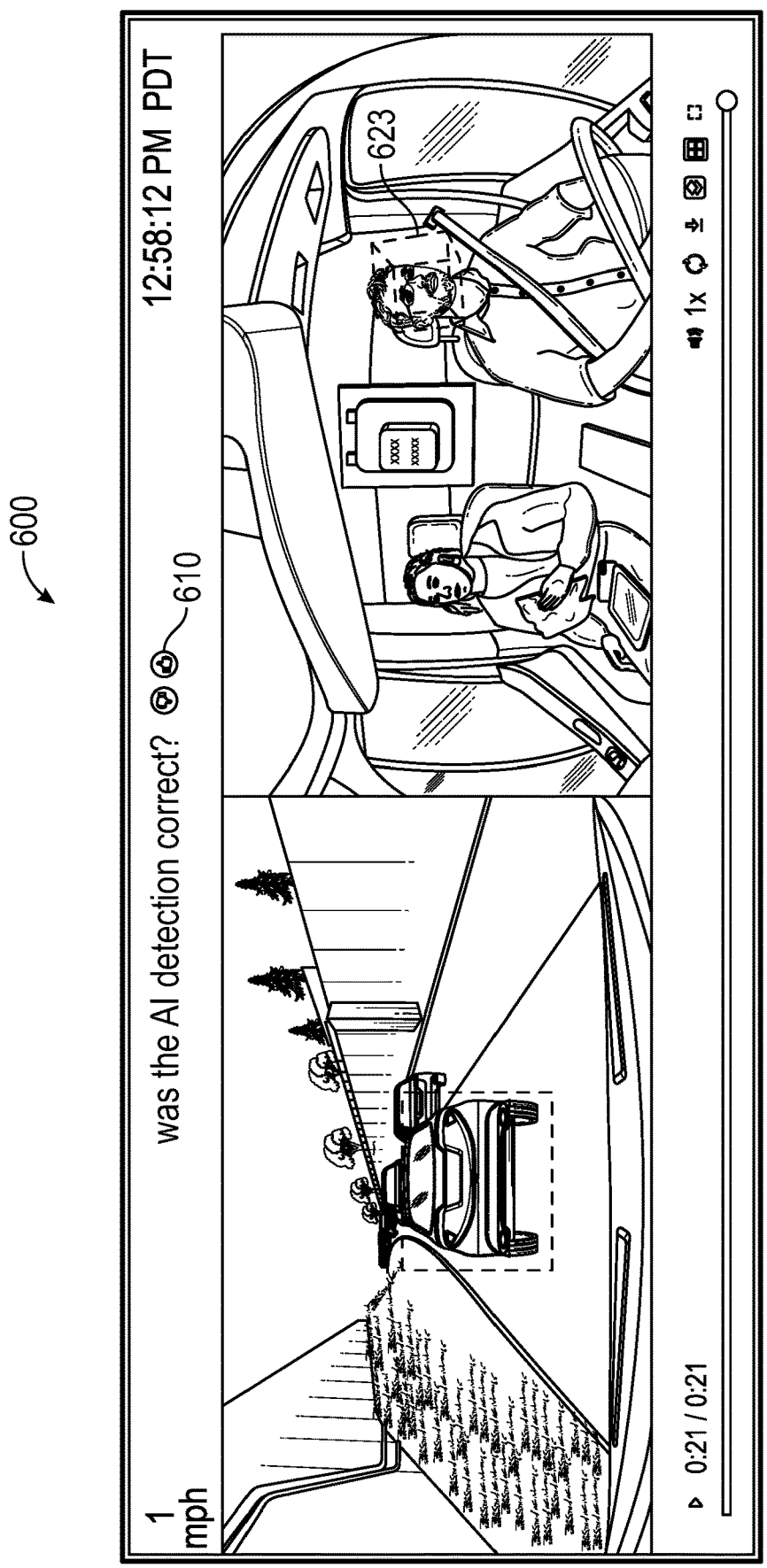
FIG. 6 provides another example user interface that may be provided as part of a safety dashboard, either as a separate user interface and/or as part of another user interface.

FIG. 6 provides another example user interface 600 that may be provided as part of a safety dashboard, either as a separate user interface and/or as part of another user interface, such as to replace video 520 and/or 522 of FIG. 5. In this example, a 3D bounding box 623 is overlaid on the detected driver of the vehicle and, similar to as discussed above, may change visual characteristics when a distracted driver event is triggered. This example, the user may provide feedback 610, in the form of a thumbs up or thumbs down, to indicate whether the distracted driver detection indicated in the video is accurate. For example, an indication of an accurate detection of a distracted driver event may cause the event data to be used as positive training data for updating a neural network configured to detect distracted driver events, while an indication of an inaccurate detection of a distracted driver event may cause the event data to be used as negative training data for updating the neural network. The neural network may be trained at the event analysis system and periodically provided to the vehicle device for improved detection of safety events.

Returning to FIG. 2, at block 212, if a safety event has been triggered the method continues to block 214 where an in-vehicle alert 214 is provided within the vehicle and event data associated with the event is identified and transmitted to the event analysis system (block 216). The in-vehicle alerts may be customized, such as based on the type of triggered event, severity of the event, driver preferences, etc. For example, in-vehicle alerts may include various audible signals and/or visual indicators of triggered safety events.

Figure 7:
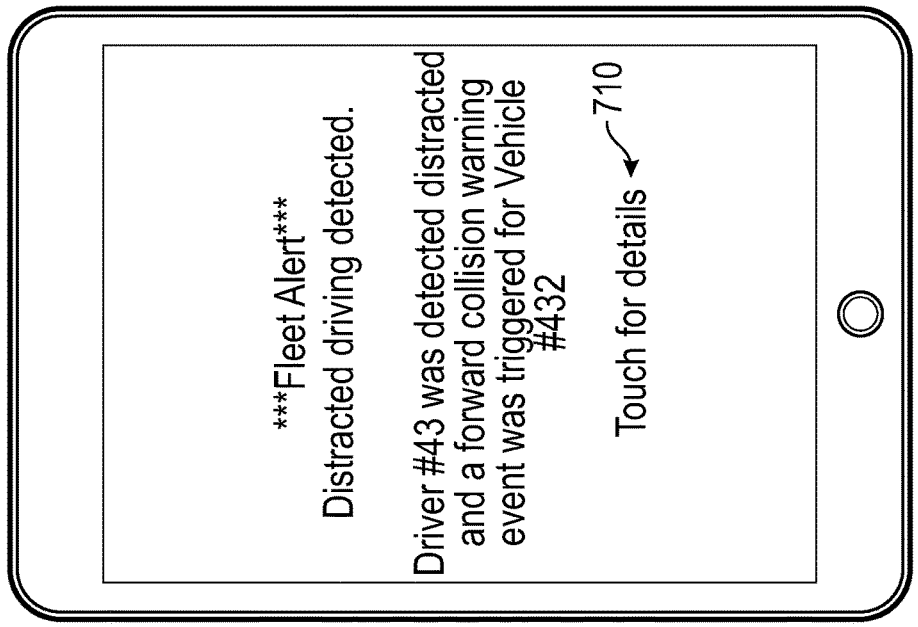
FIG. 7 illustrates an alert that may be transmitted to a user's mobile device to indicate that a distracted driving event in the vehicle was detected.

In some embodiments, alerts may also be transmitted to one or more devices external to the vehicle at block 214. For example, FIG. 7 illustrates an alert that may be transmitted to a user's mobile device to indicate that a distracted driving event in the vehicle was detected. In this example, the user may be a fleet manager, safety manager, parent or guardian of the driver, or the like, that receives the alert and may take action to ensure that the distracted driving condition is remedied. The alert may be delivered via SMS, text message, or application-specific alert, or may be delivered via the safety dashboard, email, and/or via any other communication medium.

Figure 8:
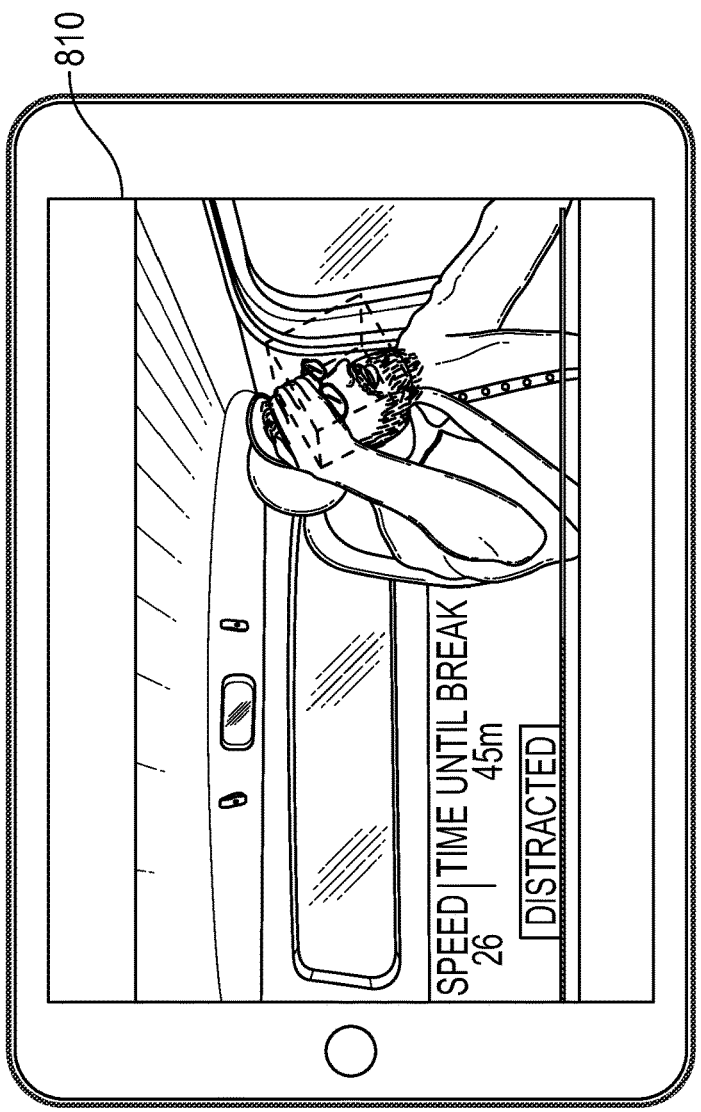
FIG. 8 is an example user interface showing a video clip from the inward-facing camera indicating that a distracted driving event has been detected.

In the example of FIG. 7, the user may select the link 710 to update the user interface to include further event data, such as a video clip 810 shown in the example user interface of FIG. 8. As shown in the example of FIG. 8, a video clip from the inward-facing camera shows the driver as the distracted driving event is detected. This additional event data may be useful for the reviewing user to decide what actions, if any, to take in an effort to reduce risks associated with the detected event. For example, the user may decide to call the driver and discuss the distracted driving condition, which may result in the driver changing course, taking a break, etc. Other event data, such as any of the event data illustrated in the user interfaces of FIGS. 4-6 may be provided to the user receiving a real-time alert from the vehicle device.

In some embodiments, metadata transmitted to the event analysis system may include data from one or more external sources, such as traffic or weather data, which may be helpful in making better determinations of camera obstruction or harsh events, for example. In some implementations, the artificial intelligence executed at the vehicle device and/or event analysis system performs feature detection that produces metadata indicating traffic and/or weather conditions, such as by analyzing video data from the outward-facing camera.

In some implementations, the event data 219 that is transmitted to the event analysis system upon detection of a driver assistance alert, such as based on neural network analysis of video data, may include metadata and only a limited (or no) other asset data. In some embodiments, event data that is transmitted to the event analysis system is selected based on settings of the triggered safety event. For example, a first safety event may indicate that certain metadata is transmitted to the event analysis system, while a second safety event may indicate that certain metadata and asset data, such as one or a few still images associated with the detected event, are transmitted upon detection of the event. For example, metadata that is transmitted to the event analysis system may include location of the object that triggered the event, such as the lead vehicle in the case of a forward collision warning or tailgating, or the head of the driver in the case of a distracted driver event, severity of the event, such as based on rules like duration of the event, distance to the lead vehicle, etc. Metadata may further include information about other vehicles or objects within the field of view of the cameras, such as speed of other vehicles, head pose information (in the case of a distracted driver event), position and/or movement of the driver's hands (e.g., coordinates, width, height) in the case of a hand-related policy violation, type of hand related policy violation (e.g., car the user's hands on a phone, eating, drinking, smoking, or empty), and/or confidence level associated with the detected type of hand-related policy violation. For other policy violations associated with an object, metadata transmitted at block 216 may include the type of event (e.g., not wearing seatbelt violation) and number of times the driver was alerted of the policy violation previously.

In some embodiments, the vehicle device executes rules (or event models in other formats) that determine whether even the metadata is transmitted to the event analysis system. For example, a rule may indicate that triggering of a particular event type that has not been detected during a predetermined time period (e.g., a cool-off time period) should not initiate transmission of event data 219 to the event analysis system. Rather, the rule may indicate that the in-vehicle alert 214 is provided to the driver as a "nudge" to correct and/or not repeat actions that triggered the safety event. The rules may further indicate that occurrence of the same safety event within a subsequent time period (e.g., 1 minute, 30 minutes, 60 minutes, etc.) causes event data 219 regarding both of the detected events to be transmitted to the event analysis system. Similarly, rules may be established to transmit event data 219 only upon occurrence of other quantities of safety events (e.g., three, four, five, etc.) during other time periods (e.g., 30 seconds, 2 minutes, 10 minutes, 20 minutes, 60 minutes, two hours, four hours, etc.). Such rules may further be based upon severity of the triggered safety events, such that a high severity safety event may be transmitted immediately (and perhaps with additional asset data) to the event analysis system, while a low severity safety event may only be transmitted once multiple additional low severity events are detected (and perhaps with no or limited asset data). As another example, in some implementations asset data may be transmitted in a "roll up" of asset data associated with multiple events (e.g., all events or events of a certain severity) during a certain period of time, such as during a work shift of the driver or a particular trip. In such an embodiment, there may be rules for exceptions to the roll up rule, such as to transmit asset data for a serious or egregious safety event separately and immediately. In some embodiments, the video data (and/or other types of asset data) may be compiled into a single video file that includes all of the detected events throughout the roll up time period. Thus, rather than the event analysis system receiving tens or hundreds of video files associated with tens or hundreds of safety events during a driver's shift, the event analysis system may receive a single video file that is a hyper-lapse showing frames from all of the safety events. In some embodiments, a hyper-lapse video may be compiled for particular types of events, e.g., all of the distraction type safety events are included in a first video file and all tailgating video may be included in a second video file.

In some embodiments, the idea of providing nudges to a driver, prior to or instead of transmitting an event detection to the event analysis system, may allow the driver to correct the actions leading to the knowledge. For example, the driver may receive a nudge indicating that the driver is tailgating a lead vehicle. In response, the driver may increase a distance between the vehicle and the lead vehicle to alleviate the tailgating condition. Thus, this corrected action taken by the driver may later be seen by a safety manager, for example, as a positive event for the driver (e.g., because the driver corrected their behavior in response to a nudge) rather than a negative event (e.g., the initial tailgating of a leading vehicle).

In some embodiments, asset data, such as video and audio data, are recorded in the sensor data store 206, even though such asset data may not be transmitted to the event analysis system initially upon triggering of a safety event (e.g., at block 216). In some implementations, the asset data may be later transmitted when the communication link supports transmission of the asset data, such as when the vehicle is within a geographic area with a high cellular data speed. Alternatively, the asset data may be transmitted when connected on a nightly basis, such as when the vehicle is parked in the garage and connected to Wi-Fi (e.g., that does not charge per kilobyte). Accordingly, the vehicle device advantageously provides immediate in-vehicle alerts upon detection of a safety event, while also allowing the event analysis system to later receive asset data associated with the detected safety events, such as to perform further analysis of the events (e.g., to update event models applied by the vehicle device) and/or to include certain asset data in a safety dashboard.

In some embodiments, once a particular asset data is transmitted to the event analysis system, that particular asset data is removed from the sensor data store 206 of the vehicle device. For example, if a five second video clip associated with a detected safety event is transmitted to the event analysis system, that five second portion of the video stream may be removed from the sensor data store 206. In some embodiments, asset data is only deleted from the vehicle device when event analysis system indicates that the particular asset data may be deleted, or until the asset data has become stale (e.g., a particular asset data is the oldest timestamped data in the sensor data store 206 and additional storage space on the sensor data store 206 is needed for recording new sensor data).

In the embodiment of FIG. 2, the event analysis system receives the event data 219, which may initially be only metadata associated with a detected event, as noted above, and stores the event data for further analysis at block 210. For example, at block 210 high-fidelity event detection models, such as higher precision neural networks than are executed on the vehicle device, may be executed to determine whether the triggered event was accurately detected. For example, event data associated with a tailgating event may be analyzed using a tailgating model in the event analysis system that is more sophisticated than the tailgating model used in the vehicle device. For example, the event models applied in the event analysis system may take as inputs additional sensor data, such as full frame video data, in detecting occurrence of safety events. Thus, the event models applied in the event analysis system may require additional event data beyond the initial event data received upon triggering of the safety event at the vehicle device. Accordingly, in the embodiment of FIG. 2, the event analysis system at block 225 determines if additional event asset data is needed to execute the event analysis system event model. Additionally, the event analysis system may determine that additional asset data is needed for a safety dashboard, such as to provide further information regarding a detected event that is more useful to a safety manager. For example, audio data that was not part of the initial event data transmitted to the event analysis system may be indicated as required for a particular detected event type. Thus, the event analysis system may determine that a particular time segment of audio data should be requested from the vehicle device.

At block 230, additional event data is requested from the vehicle device, which may fulfill the request by transmitting additional event data 219 immediately and/or at some later time in accordance with rules for transmitting additional data, such as to conserve cellular data bandwidth and transmission costs. In some embodiments, specific asset data is requested by the event analysis system, such as a particular time period of requested video or audio data, minimum and/or maximum resolution, frame rate, file size, etc. Upon receipt of the additional event data 219 at the event analysis system, the high-fidelity event models 210 may be further executed and/or trained based on both the original event data and the additional event data. This process may be repeated multiple times until the event data needed to evaluate the event analysis system models and/or meet the minimum requirements for a safety dashboard is provided.

In some embodiments, the event analysis system applies default and/or user configurable rules to determine which asset data is requested from the vehicle device. For example, a rule may be established that excludes requests for additional asset data when asset data for the same type of safety event has already been received during a particular time period. For example, the rules may indicate that asset data is requested only for the first 5 occurrence of harsh turning events during a working shift of a driver. Thus, the event analysis system receives additional asset data for some of the harsh turning events and preserves bandwidth and reduces costs by not requesting asset data for all of the harsh turning events, due to the limited value of analyzing the additional asset data associated with a recurring triggered safety event.

In some embodiments, execution of event models at the event analysis system comprises training one or more event models for better detection of the determined event type. For example, in some embodiments the event analysis system evaluates asset data that was not considered by the vehicle device in triggering the initial safety event. The event analysis system may provide suggestions and/or may automatically update event models that are restricted to analysis of certain event data (e.g., event metadata and/or certain types of asset data) based on analysis of asset data that is not analyzed by the updated event model. For example, analysis of video data associated with a safety event may identify correlations between features in the video data and acceleration data that may be used to update criteria or thresholds for triggering the particular safety event by the vehicle device. Advantageously, the event analysis system may consider event data across massive quantities of vehicles in determining updates to the event models that are executed on the vehicle device.

As noted above, event models may include neural networks that are updated over time to better identify safety events. Thus, event data may become part of a training data set for updating/improving a neural network configured to detect the safety event. As noted above, a number of diverse types of algorithms may be used by the machine learning component to generate the models. The machine learning algorithms can be configured to adaptively develop and update the models over time based on new input received by the machine learning component. For example, the models can be regenerated on a periodic basis as new received data is available to help keep the predictions in the model more accurate as the data is collected over time. Also, for example, the models can be regenerated based on configurations received from a user or management device (e.g., 130).

The safety dashboard that is provided at block 235 may include an option for the user to provide feedback on accuracy of the detected events, such as an indication of whether the safety event actually occurred or if the triggering event should be considered a false positive. Based on this user feedback, the event models may be updated at block 210, potentially for transmission back to the vehicle device as part of event model updates.

ADDITIONAL IMPLEMENTATION DETAILS
AND EMBODIMENTS

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A vehicle device comprising:
   an enclosure configured for attachment within a motor vehicle, the enclosure housing at least:
     a plurality of sensors configured to provide sensor data, the plurality of sensors including at least:
       an outward-facing camera positioned to obtain images of an area in front of the vehicle; and
       an inward-facing camera positioned to obtain images of an interior of the vehicle, including a driver area where a driver of the vehicle is positioned when operating the vehicle;
     a speaker configured to provide audible signals within the vehicle;
     a hardware computer processor; and
     a non-transitory computer readable medium having software instructions stored thereon, the software instructions executable by the hardware computer processor to cause the vehicle device to perform operations comprising:
       accessing, in real-time as images are acquired by the outward-facing camera, images of the area in front of the vehicle;
       detecting, based at least on application of an event detection model comprising one or more neural networks to at least portions of the accessed images, features within the one or more accessed images;
       evaluating, for each of a plurality of safety event types, a corresponding plurality of safety event criteria configured to identify respective safety events;
       triggering a first safety event in response to determining that the detected features match a first safety event criteria associated with a distracted driver safety event type;
       in response to triggering the first safety event, causing an audible alert to play on the speaker;
       accessing an asset data structure including associations between safety event types and respective asset data, wherein a first asset data associated with a first safety event type is different than a second asset data associated with a second safety event type;
     selecting and transmitting the first asset data to an event management system;
     receiving a request for additional sensor data from the event management system, the requested additional sensor data including asset data from one or more of the sensors, wherein the event management system determines the additional sensor data to request from the vehicle device based at least on analysis of the first asset data; and
     generating and transmitting to the event management system the requested additional sensor data.

2. The vehicle device of claim 1, wherein said detecting features includes providing a confidence level associated with each detected feature.

3. The vehicle device of claim 2, wherein the features include one or more of: identification of an object in front of the vehicle, an eye pose of the driver, a head pose of the driver, identification of objects in the inward-facing video, identification of other objects in the outward-facing video, metadata associated with identified objects, accelerometer data, global positioning system (GPS) data, ECU data, and vehicle speed data.

4. The vehicle device of claim 1, wherein the safety event indicates one or more of: a forward collision warning, a tailgating warning, a distracted driver warning, or a policy violation.

5. The vehicle device of claim 1, wherein the features of the one or more accessed images include a distance to a vehicle or object in front of the vehicle.

6. The vehicle device of claim 1, wherein the first asset data includes metadata associated with the first safety event type.

7. The vehicle device of claim 6, wherein the metadata for a forward collision warning and tailgating warning safety event types includes:
   location of a lead vehicle in front of the vehicle; and
   lead vehicle metadata associated with the lead vehicle.

8. The vehicle device of claim 1, wherein the default head pose is customized for the driver.

9. The vehicle device of claim 1, wherein the vehicle device is further configured to:
   access, in real-time as images are acquired by the inward-facing camera, inward facing images of the driver area;

detect, based at least on application of a second event detection model comprising one or more neural networks to at least portions of the accessed inward facing images, second features within the one or more inward facing images;

trigger a second safety event in response to determining that the second detected features match second safety event criteria associated with the second safety event;

determining second metadata based on the sensor data that is associated with the detected second safety event; and transmit the second metadata to the event analysis system server.

10. The vehicle device of claim 9, wherein the second features of the one or more accessed images include a head pose of the driver.

11. The vehicle device of claim 10, wherein the head pose of the driver indicates how far away from straight ahead the driver's head is positioned.

12. The vehicle device of claim 1, wherein the asset data includes metadata indicating the first safety event type, wherein the first safety event type is one or more of a forward collision warning, a tailgating warning, a distracted driver warning, or a policy violation;

wherein the vehicle device is further configured to:

access settings for determining portions of video data from one or more of the inward-facing camera and outward-facing to transmit to the event management system; and generate and transmit to the event management system the determined portions of video data associated with the detected safety event.

13. The vehicle device of claim 12, wherein generating the determined portions of video data associated with the detected safety event comprises trimming a portion of the video data and downsampling the trimmed portion of the video data.

14. The vehicle device of claim 1, wherein the first asset data includes one or more of: video files, still images, and audio data.

15. The vehicle device of claim 1, wherein the plurality of sensors further comprise:

one or more accelerometers configured to determine acceleration data associated with the vehicle, the acceleration data including at least first acceleration data in a first axis corresponding to a length of the vehicle and second acceleration data in a second axis perpendicular to the first axis.

16. A vehicle device comprising:

an enclosure configured for attachment within a motor vehicle, the enclosure housing at least:

a plurality of sensors configured to provide sensor data, the plurality of sensors including at least:

an outward-facing camera positioned to obtain images of an area in front of the vehicle; and an inward-facing camera positioned to obtain images of an interior of the vehicle, including a driver area where a driver of the vehicle is positioned when operating the vehicle;

a speaker configured to provide audible signals within the vehicle;

a hardware computer processor; and a non-transitory computer readable medium having software instructions stored thereon, the software instructions executable by the hardware computer processor to cause the vehicle device to perform operations comprising:

accessing, in real-time as images are acquired by the outward-facing camera, images of the area in front of the vehicle;

detecting, based at least on application of an event detection model comprising one or more neural networks to at least portions of the accessed images, features within the one or more accessed images;

evaluating, for each of a plurality of safety event types, a corresponding plurality of safety event criteria configured to identify respective safety events;

triggering a first safety event in response to determining that the detected features match a first safety event criteria associated with a distracted driver safety event type;

in response to triggering the first safety event, causing an audible alert to play on the speaker;

accessing an asset data structure including associations between safety event types and respective asset data, wherein a first asset data associated with a first safety event type is different than a second asset data associated with a second safety event type;

selecting and transmitting the first asset data to an event management system;

receiving a request for additional sensor data from the event management system, the requested additional sensor data including asset data from one or more of the sensors, wherein the event management system determines the additional sensor data to request from the vehicle device based at least on analysis of the first asset data; and generating and transmitting to the event management system the requested additional sensor data.

* * * * *